July 29, 1969  H. W. LORD  3,458,843
BROADBAND SHIELDED TRANSFORMERS
Filed Dec. 28, 1964  2 Sheets-Sheet 1
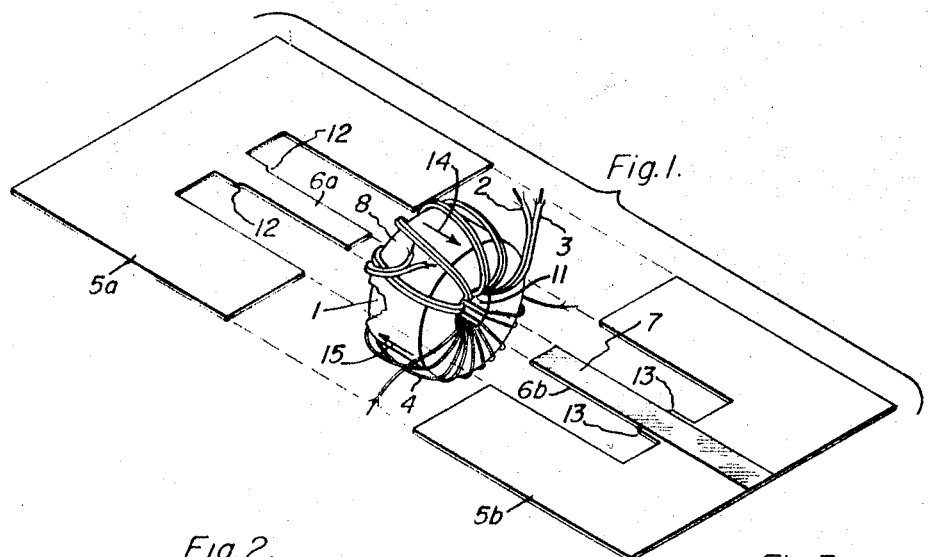
Fig. 1.
Fig. 2.
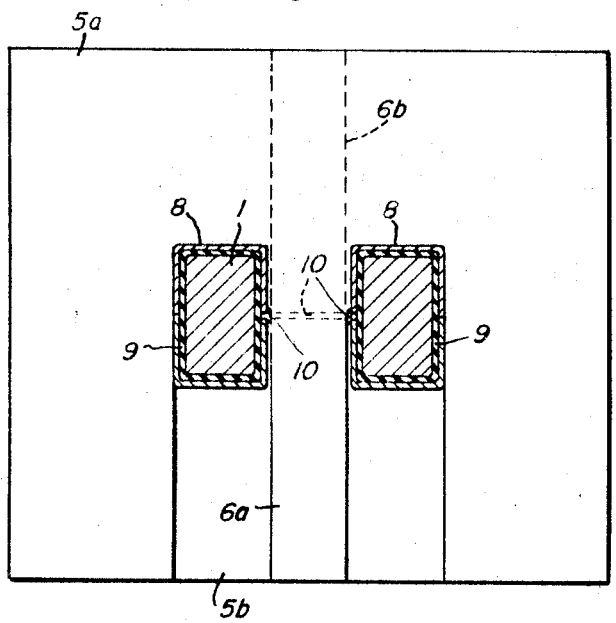
Fig. 3.
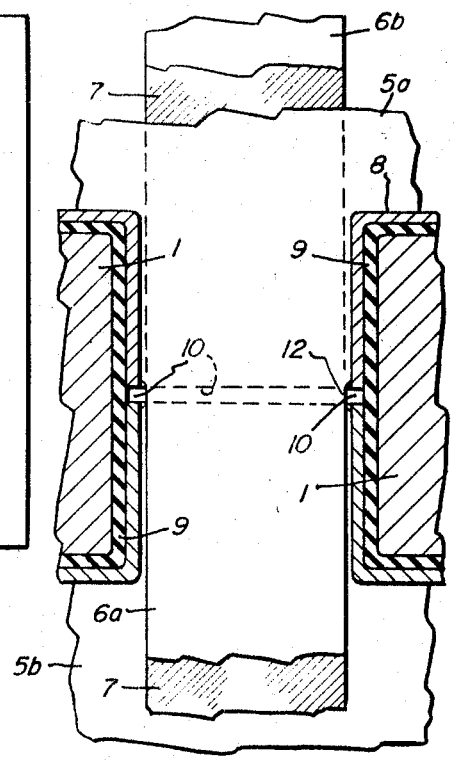
Fig. 4.
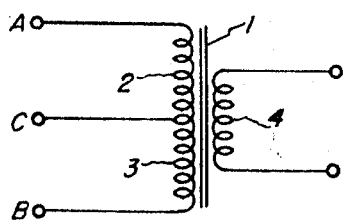
Inventor:
Harold W. Lord,
by John P. Dellett
His Attorney.

July 29, 1969     H. W. LORD     3,458,843
BROADBAND SHIELDED TRANSFORMERS
Filed Dec. 28, 1964     2 Sheets-Sheet 2

*Inventor:*
Harold W. Lord,
by John P. Dillett
*His Attorney.*

United States Patent Office 3,458,843
Patented July 29, 1969

3,458,843
BROADBAND SHIELDED TRANSFORMERS
Harold W. Lord, Schenectady, N.Y., assignor to General
Electric Company, a corporation of New York
Filed Dec. 28, 1964, Ser. No. 421,364
Int. Cl. H01f 15/04
U.S. Cl. 336—84      9 Claims

ABSTRACT OF THE DISCLOSURE

The primary and secondary windings of a toroidal core transformer are electrostatically separated by a ground shield comprising a pair of E-shaped laminations perpendicularly disposed relative to the plane of the core with the central tongues of the laminations passing through the aperture of the toroidal core. A second, or coupling, longitudinally slotted shield surrounds the toroidal core in tubular fashion and is electrically connected to the ground shield at the intersection of the two shields except for the area of the longitudinal slot. When the transformer windings are wound on different cores, the cores are substantially isolated from one another by a shield having an aperture of sufficient size to permit passage of a coupling shield between the transformer windings.

---

Figure 5:
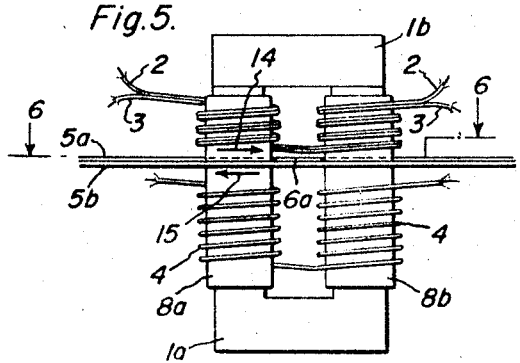

The present invention relates to high frequency transformers and particularly to broadband shielded transformers maintaining a high degree of isolation between the windings thereof.

There are frequent transformer applications wherein a high degree of electrostatic isolation between primary and secondary windings is desired in order to reduce coupling capacitance between windings. One such application involves common-mode rejection or the rejection of certain voltages which may be present on an input winding. In the instance of common-mode rejection it is desired to transform, to the secondary, voltages appearing across a transformer's primary terminals, but prevent voltages from reaching the secondary which may have the same value on the primary terminals. Noise is an example of a common-mode voltage which may be present upon each side of a primary winding. In practice, isolation is not easily achieved, especially when the common-mode signal is large with respect to the signal desired.

Electrostatic shielding may be used to separate the primary and secondary windings and thereby reduce undesired common-mode coupling. However, this type of separation ordinarily results in an increase in leakage inductance leading to attenuation at high frequencies and a reduction of the pass band. Leakage inductance can be reduced in an electrostatically shielded transformer as disclosed and claimed in my patent, 2,553,324, issued May 15, 1951. As set forth therein, the shielding can operate as a coupling winding acting to reduce leakage inductance between windings in addition to performance of its shielding function. However, as the frequency of operation is increased, a lead or strap connecting the electrostatic shield means to ground takes on considerable inductive reactance allowing the shield to have a voltage with respect to ground and thereby detracting somewhat from its shielding effectiveness. Double and triple shields improve isolation, but at very high frequencies the advantage of multiple shields is offset by capacitance between shields.

It is therefore an object of the present invention to provide a transformer for operation, especially at high frequencies, having improved shielding means achieving substantially complete isolation between primary and secondary windings.

It is another object of the present invention to provide a transformer wherein primary and secondary windings are substantially completely isolated electrostatically, without introduction of excessive leakage inductance in the transformer.

In accordance with the present invention, a transformer includes a primary winding and a secondary winding completely separated from the primary winding by a ground plane or shield, which may, for example, comprise the ground plane or chassis of the electrical equipment with which the transformer is connected. Thus the transformer ground plane or shield is relatively massive and resides substantially entirely at ground potential. A second transformer shield passes from one side of the aforementioned ground plane to the other and is disposed in electromagnetic coupling relation to both the primary and secondary winding. This second shield generally intersects the ground plane and is nearly entirely joined to the ground plane where the second shield "passes through" or intersects the ground plane. The second shield, acting as a winding, provides substantial electromagnetic transformer coupling between the primary and the secondary even though the primary and secondary are entirely separated from one another on either side of the ground plane.

In accordance with an embodiment of the present invention, the transformer employs a closed magnetic core, that is one comprising a complete magnetic circuit around an aperture. The core may take the form of a toroid positioned relative to a ground plane or shield such that the toroidal core extends through the ground plane with a portion thereof on either side of the ground plane. A second or coupling shield substantially surrounds the core in tubular fashion and has a longitudinal slot to prevent the configuration from becoming a short-circuited turn; however, current is allowed to flow along the coupling shield. This coupling shield is nearly completely joined to the ground plane where it "passes through" the ground plane, except for the area of the slot. One winding is wound around the coupling shield, and core, on one side of the ground plane, and the other winding is wound around the coupling shield and core on the remaining side of the ground plane, whereby the windings are electrostatically isolated from one another.

In accordance with another embodiment of the present invention, a transformer employs two apertured cores with windings thereon, the cores being substantially isolated from one another in compartments of a grounded container or the like. An interior wall of the container separates the two cores from one another except for an aperture aligned with the core apertures. A second interior wall extends through the apertures of the cores and the first interior wall providing coupling between the two cores.

In the various embodiments of the present invention, the windings are substantially completely isolated and separated from one another because of the ground plane, but good coupling is provided, that is leakage inductance is substantially reduced, because of the second or coupling shield passing through the first. Since the shielding between primary and secondary is complete, a high degree of common-mode rejection is obtained, but this is accomplished without the presence of excessive leakage inductance.

Figure 7:
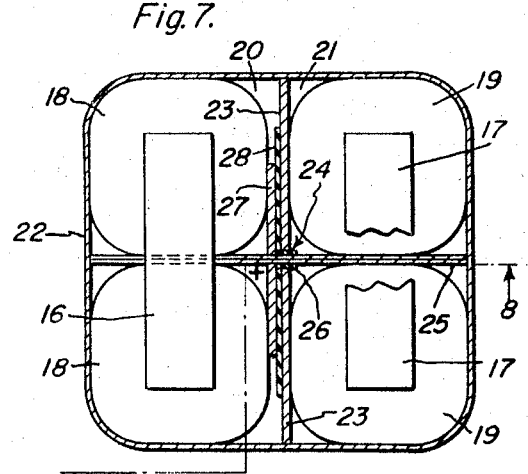
Figure 6:
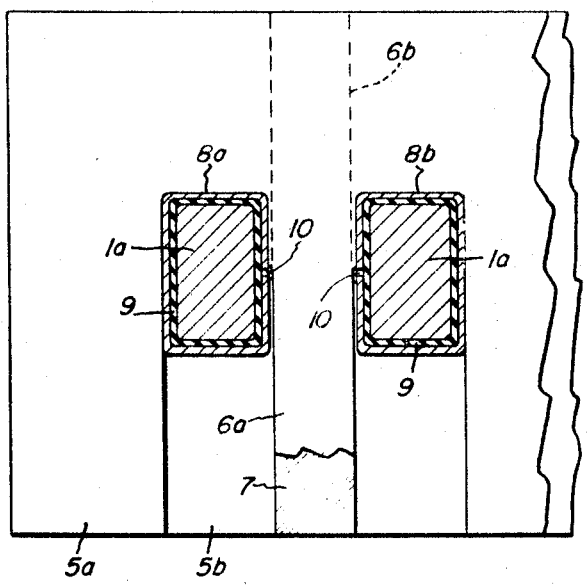
Figure 8:
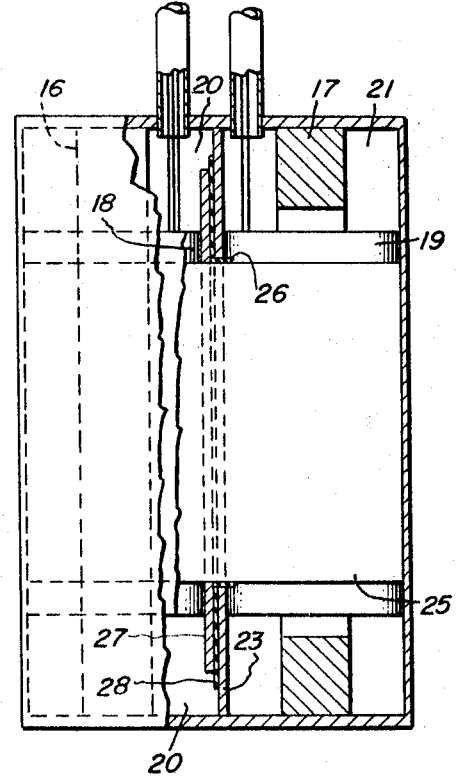
Figure 9:
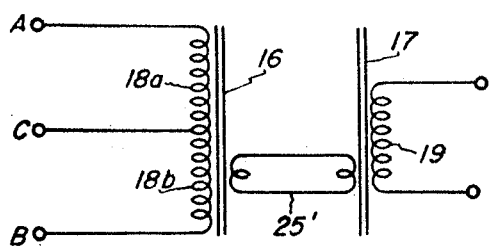

The subject matter which I regard as my invention is particularly pointed out and distinctly claimed in the concluding portion of this specification. The invention, however, both as to organization and method of operation, together with further objects and advantages thereof, may best be understood by reference to the following description taken in conjunction with the accompanying drawings wherein like references refer to like elements and in which:

FIG. 1 is an exploded view of a first transformer embodiment according to the present invention, FIG. 2 is a cross-sectional view through the core of the FIG. 1 embodiment, FIG. 3 is an enlarged view of the central portion of the transformer cross-section in FIG. 2, FIG. 4 is a schematic diagram illustrating winding connections for the FIG. 1 embodiment, FIG. 5 is a side view of a second embodiment according to the present invention, FIG. 6 is a cross-sectional view through the core of the FIG. 5 embodiment, FIG. 7 is a partial cross-sectional view of the third embodiment of the present invention, FIG. 8 is a side view partially in section fo the FIG. 7 embodiment, and FIG. 9 is a circuit diagram illustrating connections appropriate for the FIG. 7 embodiment.

Referring to FIGS. 1 through 3, illustrating a first high frequency transformer embodiment according to the present invention, a toroidal core 1, conveniently formed of ferrite or powdered iron oxide, has wound therearound primary windings 2 and 3, and a secondary winding 4. The primary windings are wound together and are diametrically separated from the secondary winding 4, the latter being wound on the opposite side of the core. The primary and secondary windings also are separated from one another with intervening shield or ground plane 5a–5b formed of E-shaped laminations 5a and 5b respectively provided with tongue members 6a and 6b for extending through the central aperture of the toroid between the primary and secondary windings. Although the transformer is shown in exploded fashion in FIG. 1, with ground plane laminations 5a and 5b separated from the core for ease of illustration and understanding, it is understood these laminations are completely secured to one another, as by soldering, except in the area of tongues 6a and 6b at which point a strip of insulation 7 separates the two.

Ground plane 5a–5b is relatively large or massive in comparison to the transformer core and may conveniently form a part of a chassis for electrical equipment in which the transformer is employed. Alternatively the ground plane 5a–5b is soldered or otherwise connected to the system ground over a considerable portion of the ground plane; for instance, the ground plane may be supported upon one side, extending perpendicularly to an equipment chassis, with its entire side soldered or otherwise continuously connected to the chassis ground. When the ground plane is thus a portion of the equipment chassis itself, the primary windings 2–3 are wound around the core entirely on one side, e.g., inside such chassis, while the secondary winding 4 is wound entirely outside the chassis, or vice versa.

A second or coupling shield 8 encases toroidal core 1 in tubular fashion and separates the core from windings 2, 3 and 4. Shield 8 entirely "passes through" grounded plane 5a–5b, from one side of the ground plane to the other, where shield 8 intersects the ground plane, with insulating means 9 disposed between the core and shield 8. Encasing of the core in shield 8 is desirably complete except for a slot 10 extending completely around shield 8, e.g. circularly inside the core aperture 11, around its inside circumference. Slot 10 prevents shield 8 from becoming a shorted turn with respect to the transformer. The shield plane 5a–5b is completely joined, as by soldering, to shield 8 except in the area of slot 10, and this exception is again to prevent the slot from being shorted out. Tongues 6a and 6b are reduced in width halfway through aperture 11 at points 12 and 13 and are insulated so the tongues will not short out shield 8 at slot 10.

FIG. 4 is a schematic diagram showing a manner in which the foregoing transformer may be connected. In this diagram, primary windings 2 and 3, having terminals A and B, are equal and are joined together at center-tap C, to form one primary winding. Secondary winding 4 also wound on core 1 is inductively related thereto. It is understood a signal of a first polarity may appear across terminals A and B, in response to which it is desired to induce a voltage in secondary 4. However, small common-mode voltages, in phase and equal at terminals A and B with respect to terminal C, and in-phase with one another, should be rejected from producing an output at secondary winding 4. Such common-mode voltages should theoretically not produce an output since they are equal and in-phase. However, a common-mode voltage on all the primary terminals, for example, can be coupled to the secondary by capacitance to the secondary in the usual transformer. This is especially true when the common-mode voltage is large with respect to the signal voltage desired. According to the complete separation and shielding of the transformer windings of the present invention, common-mode voltages have an attenuation of 40 db or more at the secondary, and moreover this result is accomplished without the introduction of excessive leakage inductance attributable to the separation as hereinafter explained.

In operation of the transformer according to the present invention, ground plane 5a–5b electrostatically and physically separates primary windings 2–3 and secondary winding 4 for preventing capacitive coupling therebetween, and therefore maximizing common-mode rejection. Shield 8, which may be described as a coupling shield, prevents excessive leakage inductance between windings. Without reducing electrostatic shielding between the windings, coupling shield 8 provides an electromagnetic coupling between the windings which reduces the leakage inductance and thereby extends the high frequency pass band. The operation of coupling shield 8 will be described with reference to FIGS. 1–3. Application of voltage to the primary induces a voltage in the coupling shield 8 across slot 10 and a current flow in shield 8 as indicated by arrow 14. This voltage is present across slot 10 not only from the point of view of the primary side of the ground plane, but from the secondary side also. The voltage then causes a current to flow around shield 8 on the secondary side of the shield plane indicated by arrow 15. Shield plane 8 may be thought of as a coupling winding between the primary and secondary whereby to prevent such decoupling as is caused by high leakage inductance. The shield in effect provides a low value of leakage inductance in shunt with the leakage inductance otherwise present in the transformer, thereby reducing total leakage inductance to a minimum.

It is appreciated that although only one shield 8 is shown in the drawing, multiple shields around core 1 may be employed. These shields should be insulated from one another with each one slotted to prevent the shorting thereof. The gaps or slots may appear alternately within aperture 11 of core 1 and then at the outer periphery of core 1, with the last or outside gap preferably disposed within aperture 11.

Although in the foregoing embodiments the outer insulated gap 10 is advantageously located within aperture 11, insulated gap 10 may also be disposed at some other point rather than within aperture 11. It should not be shorted with ground plane 5a–5b, but ground plane 5a–5b should also provide an insulated gap as with overlapped and insulated laminations at such point. In the illustrated embodiments, the overlapping tongues 6a and 6b facilitate insulation one from the other and therefore the insulation of gap 10, without any significant break in the shield plane 5a–5b.

A second embodiment of the invention is depicted in FIGS. 5 and 6 wherein like reference numerals refer to like elements. This embodiment operates substantially in the same manner as hereinbefore described, a principal difference being the shape of the transformer core comprising a U-shaped portion, 1a, and a top portion, 1b. In addition, coupling shield members 8a and 8b do not extend all the way around the core but only encase the straight sides of the "U." These tubular coupling shields extend "through" ground plane 5a–5b where they are soldered or otherwise joined to the ground plane as in the case of the previous embodiment except for the slotted and tongued portion at 10 illustrated more clearly in FIG. 6. In this embodiment as in the previous one, the ground plane 5a–5b provides substantially complete electrostatic separation between primary windings 2–3 and the secondary winding 4 wound around the coupling shields 8a and 8b. However, as before the coupling shields provide coupling between primary and secondary. It is understood that the windings are advantageously wound around coupling shields on both legs of the core as shown, but need not be. Thus, the transformer is operative employing only a coupling shield 8a with the windings wound thereon. Construction and operation is otherwise similar to that depicted in the previous embodiment.

A particular advantage of the embodiments described above, and illustrated in FIGS. 1 through 6, relates to electrical balance of the coupling shields with respect to ground thereby aiding isolation. The neutral point of shield 8 exists where shield 8 passes through shield plane 5a–5b, and the voltages induced in shield 8 on either side of the shield plane at the aperture slot may be described as substantially equal and opposite with respect to ground.

FIGS. 7 through 9 illustrate a third embodiment of the present invention primarily intended for somewhat lower frequency operation, e.g. for use in the audio-frequency region. This embodiment employs two closed and apertured cores 16 and 17 having windings 18 and 19 wound respectively thereon. The cores with their windings are housed in separate compartments 20 and 21 of a grounded shield container 22. A first partition 23 separates cores 16 and 17 from one another. Partition 23 extends from one side to the other of the container and closes off the two compartments except for a small slot 24 aligned with the apertures of cores 16 and 17. A second partition 25 extends from one remaining side wall of container 22 and through slot 24 to the other remaining side wall. Except for a thin layer of insulation 26, slot 24 closely receives the partition 25. In order to thoroughly shield the slot 24, a shield member 27 desirably extends in either direction from partition 25 along partition 23 and is separated therefrom with a thin layer of insulation 28.

In this embodiment, partition 25 (together with outside of container 22) may be thought of as a coupling means or winding between two cores 16 and 17, while the partition 23, together with the container 22, forms a massive ground-level shield plane otherwise substantially separating the cores 16 and 17 from one another. The operation of this embodiment will be explained with reference to the diagram of FIG. 9 where primary 18 has portions 18a and 18b forming a center-tapped configuration wound on first core 16. Secondary 19 is wound upon a second core 17. The inter-coupling is provided with a coupling link 25' whose function is performed by means of the above mentioned partition 25. Referring again to FIG. 7, a voltage, which is induced in partition 25 near aperture 24 (indicated by the + sign) as the result of electromagnetic induction from core 16, will be present on both sides of aperture 24. This voltage will cause a current flow in the shield around core 17 electromagnetically producing flux within core 17 and a corresponding current in winding 19, thereby coupling the primary and secondary together. As in the previous embodiments it is again seen that the primary and secondary windings are completely electrostatically isolated from one another by means of a massive ground plane member, but a shield plane passing through the ground plane provides coupling therebetween whereby leakage inductance is substantially reduced.

While I have shown and described several embodiments of my invention, it will be apparent to those skilled in the art that many changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. A transformer comprising a toroidal core and primary and secondary windings wound on said core in spaced relation from one another thereon, a coupling shield disposed around said core between each of said windings and said core and being longitudinally split along said core, said shield forming an electromagnetic coupling winding between said primary and secondary windings, and a ground shield intersecting said coupling shield between said primary and said secondary winding for physically separating said primary winding from said secondary winding, said ground shield and said coupling shield being electrically joined at said points of intersection, the portion of said ground shield joined to said coupling shield on one side of said split being electrically discontinuous across said split relative to the portion of said ground shield joined to the coupling shield on the opposite side of said split.

2. A transformer comprising a toroidal core, primary and secondary windings wound on said core in spaced relation to one another, a coupling shield also wound around said core between said windings and said core and having a gap along said core, and a ground shield substantially perpendicular to the plane of said toroidal core intersecting said coupling shield between said primary winding and said secondary winding and joined to said coupling shield on each side of said toroidal core.

3. The transformer according to claim 2 wherein said ground shield comprises at least two E-shaped laminations each having a central tongue disposed through the center of said toroidal core, and means insulating said tongues from one another.

4. A transformer comprising a core, primary and secondary windings wound on said core in spaced relation to one another, a coupling shield disposed around said core between said core and said windings, said coupling shield having a longitudinal split across its length and being situated in electromagnetic coupling relationship to both said windings, a ground shield electromagnetically separating said windings and intersecting said coupling shield, said ground shield being electrically joined to said coupling shield at the intersection of said shields and being electrically discontinuous across said split, and means situated at the discontinuity of said ground shield for electrically insulating and physically separating the portion of said ground shield joined to the coupling shield on one side of said split from the portion of said ground shield joined to said coupling shield on the opposite side of said split.

5. A transformer comprising a closed core forming a complete magnetic circuit around an aperture, primary and secondary windings wound on the same core in spaced relation to one another, a coupling shield disposed along said core between said core and said windings, said coupling shield being split towards said aperture, and a ground shield substantially perpendicularly intersecting said coupling shield between said primary and secondary windings acting to completely separate said primary and secondary windings.

6. A transformer comprising a closed core forming a complete magnetic circuit around an aperture including first and second legs and end pieces, coupling shields disposed around each of said legs which are split towards said aperture, a ground shield substantially perpendicular to said coupling shields intersecting and joined to both said coupling shields, a primary winding wound on both of said legs around said coupling shields on one side of said ground shield and a secondary winding wound on both of said legs around said coupling shields on the other said of said ground shield.

7. The transformer according to claim 6 wherein said ground shield comprises at least a pair of E-shaped laminations having central tongues passing through the aperture of said core, which tongues are insulated one from the other.

8. A transformer comprising a first closed and apertured core having a winding thereon, a second closed and apertured core also having a winding thereon disposed in substantially parallel relation to said first core with its aperture in substantial alignment with the aperture of said first core, a conductive metal enclosure disposed substantially around both said cores, a first conductive partition extending between the walls of said enclosure separating said first and second cores and the windings thereon except for an aperture aligned with the apertures of said cores, a second conductive partition substantially perpendicular to the first extending between walls of said enclosure and passing through the apertures of said cores and the aperture in said first partition and a layer of insulating material between said first partition and said second partition where the second partition passes through the aperture in said first partition, the aperture in said first partition being only wide enough to pass said second partition and said insulating layer.

9. The transformer according to claim 8 including further shield means joined to said second partition disposed between one of said cores and the windings thereon and said first partition, and an insulating layer separating said further shield means from said first partition.

References Cited

UNITED STATES PATENTS

| | | | |
|---|---|---|---|
| 2,114,189 | 4/1938 | Kronmiller | 336—84 |
| 2,862,194 | 11/1958 | Coggeshall et al. | 336—84 X |
| 2,878,441 | 3/1959 | Rogers et al. | 336—84 X |
| 3,020,502 | 2/1962 | Graham | 336—2.29 X |
| 3,039,042 | 6/1962 | Chatterton | 336—84 X |
| 3,153,758 | 10/1964 | Kusters et al. | 336—84 X |
| 3,244,960 | 4/1966 | Stevens et al. | 336—84 X |

LEWIS H. MYERS, Primary Examiner

T. J. KOZMA, Assistant Examiner

U.S. Cl. X.R.

336—184, 229